US010652939B2

(12) United States Patent
Agiwal et al.

(10) Patent No.: US 10,652,939 B2
(45) Date of Patent: May 12, 2020

(54) METHOD AND APPARATUS FOR DEVICE-TO-DEVICE COMMUNICATION

(71) Applicant: Samsung Electronics Co., Ltd., Suwon-si, Gyeonggi-do (KR)

(72) Inventors: Anil Agiwal, Suwon-si (KR); June Hwang, Incheon (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 15/324,854

(22) PCT Filed: Apr. 7, 2016

(86) PCT No.: PCT/KR2016/003639
§ 371 (c)(1),
(2) Date: Jan. 9, 2017

(87) PCT Pub. No.: WO2016/163767
PCT Pub. Date: Oct. 13, 2016

(65) Prior Publication Data
US 2017/0208636 A1 Jul. 20, 2017

(30) Foreign Application Priority Data

Apr. 7, 2015 (IN) .......................... 1818/CHE/2015

(51) Int. Cl.
*H04W 4/00* (2018.01)
*H04W 76/14* (2018.01)
(Continued)

(52) U.S. Cl.
CPC .......... *H04W 76/14* (2018.02); *H04B 17/318* (2015.01); *H04W 8/00* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2006/0089964 A1* 4/2006 Pandey ............... H04W 40/246
709/203
2010/0323614 A1 12/2010 Yu et al.
(Continued)

FOREIGN PATENT DOCUMENTS

| WO | 2014/069064 A1 | 5/2014 |
| WO | 2015/015242 A1 | 2/2015 |
| WO | 2015/026111 A1 | 2/2015 |

OTHER PUBLICATIONS

Chinese Office Action dated Mar. 4, 2020, issued in Chinese Application No. 201680020087.6.

*Primary Examiner* — Siren Wei
(74) *Attorney, Agent, or Firm* — Jefferson IP Law, LLP

(57) ABSTRACT

A device-to-device (D2D) communication method is provided. The D2D communication method includes the operations of receiving, by a first terminal, system information including a threshold value for link quality with a base station (BS) from the BS, measuring, by the first terminal, the strength of a signal from a serving cell, comparing, by the first terminal, the measured strength of the signal with the threshold value, and searching for a second terminal acting as a relay between the first terminal and a network when the measured strength of the signal is less than the threshold value on the basis of the compared result.

16 Claims, 8 Drawing Sheets

(51) Int. Cl.
*H04W 76/20* (2018.01)
*H04W 48/10* (2009.01)
*H04W 8/00* (2009.01)
*H04W 40/12* (2009.01)
*H04W 88/04* (2009.01)
*H04W 40/24* (2009.01)
*H04B 17/318* (2015.01)
*H04W 76/23* (2018.01)
*H04W 40/22* (2009.01)
*H04W 48/12* (2009.01)

(52) U.S. Cl.
CPC ........... *H04W 8/005* (2013.01); *H04W 40/12* (2013.01); *H04W 40/22* (2013.01); *H04W 40/246* (2013.01); *H04W 48/10* (2013.01); *H04W 76/20* (2018.02); *H04W 76/23* (2018.02); *H04W 88/04* (2013.01); *H04W 48/12* (2013.01)

(56) References Cited

U.S. PATENT DOCUMENTS

| | | | |
|---|---|---|---|
| 2011/0136484 A1 | 6/2011 | Braun et al. | |
| 2011/0188398 A1* | 8/2011 | Baba | H04B 7/15542 370/252 |
| 2012/0099466 A1* | 4/2012 | Aoyama | H04L 5/0091 370/252 |
| 2014/0016537 A1 | 1/2014 | Khobare et al. | |
| 2014/0286284 A1* | 9/2014 | Lim | H04W 76/14 370/329 |
| 2015/0215028 A1* | 7/2015 | Ljung | H04W 88/04 370/315 |
| 2015/0230114 A1* | 8/2015 | Delsol | H04W 36/0094 370/252 |
| 2016/0204847 A1 | 7/2016 | Ryu et al. | |

* cited by examiner

METHOD AND APPARATUS FOR DEVICE-TO-DEVICE COMMUNICATION

CROSS-REFERENCE TO RELATED APPLICATION(S)

This application is a U.S. National Stage application under 35 U.S.C. § 371 of an International application filed on Apr. 7, 2016 and assigned application number PCT/KR2016/003639, which claimed the benefit of an Indian application filed on Apr. 7, 2015 in the Indian Patent Office and assigned Serial number 1818/CHE/2015, the entire disclosure of each of which is hereby incorporated by reference.

TECHNICAL FIELD

The present disclosure relates to a method and apparatus for searching and discovering a relay in a communication system that supports device to device (D2D) communication.

BACKGROUND

To meet the demand for ever-increasing wireless data traffic since commercialization of the 4th generation (4G) communication system, there have been efforts to develop an advanced 5th generation (5G) or pre-5G communication system. The 5G or pre-5G communication system is called a beyond 4G network communication system or post LTE system.

Implementation of the 5G communication system using ultra-frequency (mmWave) bands, e.g., 60 GHz bands is considered to achieve higher data rates. To reduce propagation loss of radio waves and increase a transmission distance in the ultra-frequency bands, beamforming, massive multiple-input multiple-output (MIMO), full dimensional MIMO (FD-MIMO), array antenna, analog beamforming, large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system.

In addition, in the 5G system, an advanced coding modulation (ACM), e.g., hybrid frequency-shift keying (FSK) and quadrature amplitude modulation (QAM) modulation (FQAM), sliding window superposition coding (SWSC), and an advanced access technology, e.g., filter bank multi carrier (FBMC), non-orthogonal multiple access (NOMA), sparse code multiple access (SCMA) are being developed.

In the meantime, as the Internet of things (IoT) emerges, interest is rising in a D2D communication technology as a communication method for working with smart devices. The D2D communication technology is operated based on physical proximity between devices, and has a lot of benefits in terms of increased efficiency of a network resource, decreased power consumption of a device, expanded cellular communication range, etc. In order to reflect these situations, the D2D technology was selected in 3GPP Release 12 as a study item as of 2011, followed by the start of a study on its validity in the name of proximity-based service (ProSe), and real standardization work has been proceeded from 2013.

During the D2D communication, a D2D user equipment (UE), which is a transmitter, can transmit data packets to a UE group including intended D2D UEs or broadcast data packets to all the D2D UEs. D2D communication between the transmitter and receiver(s) is inherently connectionless. In other words, there is no connection set up between the transmitter and the receiver until the transmitter starts to send data packets. Furthermore, in sending the data packets, the transmitter includes source identification (ID) and a destination ID in the data packet. The source ID is set to the UE ID of the transmitter. The destination ID is a broadcast ID or group ID of an intended receiver of the packet for transmission.

One of the D2D communication requirements is to enable a remote UE out of coverage of a network to communicate with the network via another UE, which is in coverage of the network and is in proximity to the remote UE. Such a UE serving as a relay is termed as a 'UE-to-network relay'.

FIG. 1 shows communication between a remote UE and a UE-to-network relay using D2D communication according to the related art.

Referring to FIG. 1, a remote UE 101 is a UE, which may communicate with a network through a UE-to-network relay 102 and is in coverage of the network while trying to communicate with the network through the UE-to-network relay. D2D communication 104 is performed between the remote UE 101 and the UE-to-network relay 102, and cellular communication 105 is performed between the UE-to-network relay 102 and an evolved node B (eNB) 103.

A D2D direct discovery process is used to discover a UE-to-Network relay. In order for the remote UE 101 to discover the UE-to-network relay 102, the UE-to-network relay 102 may periodically send (or announce) discovery information (e.g., its UE ID and indication that it is a UE-to-network relay) in a relay discovery announcement message. The remote UE may use the relay discovery announcement message in searching/discovering a nearby UE-to-network relay. The remote UE monitors discovery resources or physical channels for discovery information sent by nearby UEs to discover a UE-to-network relay in its proximity. Furthermore, the remote UE may search/discover a UE-to-network relay by sending a discovery solicitation message indicating that it is searching/discovering a UE-to-network relay. The UE-to-network relay involved in relaying monitors the discovery resources or physical channels for the relay discovery solicitation message from the remote UE, and responds to the relay discovery solicitation message with a relay discovery announcement message or a response message.

The above information is presented as background information only to assist with an understanding of the present disclosure. No determination has been made, and no assertion is made, as to whether any of the above might be applicable as prior art with regard to the present disclosure.

SUMMARY

In a case of the method for searching/discovering a user equipment (UE)-to-network relay, if a remote UE starts searching/discovering a UE-to-network relay after it is out of coverage of a network, it takes the remote UE a significant amount of time making it impossible for communication. Furthermore, the remote UE goes into a similar situation even if the remote UE needs to switch to a different UE-to-network relay from that through which it communicates with the network. It may take the remote UE several seconds to select a UE-to-network relay from many UE-tonetwork relays by searching/discovering and performing measurement on the UE-to-network relay(s). Such a delay should be minimized because communication with the network is sensitive to the rate.

Aspects of the present disclosure are to address at least the above-mentioned problems and/or disadvantages and to provide at least the advantages described below. Accordingly, an aspect of the present disclosure is to provide an improved method and apparatus for searching/discovering a UE-to-network relay.

In accordance with an aspect of the present disclosure, a method for device-to-device (D2D) communication is provided. The method includes receiving, by a first device, system information including a threshold of quality of a link with an evolved node B (eNB) from the eNB, measuring, by the first device, a strength of a signal from a serving cell, comparing, by the first device, the measured signal strength with the threshold, and discovering a second device that serves as a relay between the first device and a network, if the measured signal strength is less than the threshold as a result of the comparison.

In accordance with another aspect of the present disclosure, a device for D2D communication is provided. The device includes a transceiver configured to perform cellular communication with an eNB and perform D2D communication with an opponent device in a direct communication path, and at least one processor configured to receive system information including a threshold of quality of a link with the eNB, measuring a strength of a signal from a serving cell, compare the measured signal strength with the threshold, and discover a first relay device that serves as a relay between the transceiver and a network, if the measured signal strength is less than the threshold as a result of the comparison.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to explaining various embodiments of the present disclosure, several terms used in this specification will be described first. However, it will be appreciated that those terms are not limited to what will be described below.

A base station (BS) is an entity for communicating with a user equipment (UE) and may also be referred to as BS, node B (NB), evolved NB (eNB), access point (AP), etc. UE is an entity for communicating with an eNB and may also be referred to as UE, mobile station (MS), mobile equipment (ME), device, terminal, etc.

A method for searching/discovering a UE-to-network relay in accordance with an embodiment of the present disclosure will now be described with reference to accompanying drawings.

Figure 1:
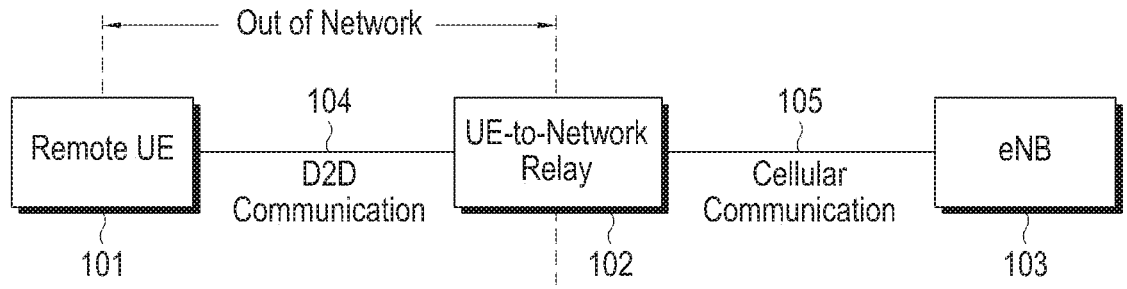
FIG. 1 shows communication between a remote user equipment (UE) and a UE-to-network relay using device-to-device (D2D) communication according to the related art.
Figure 2:
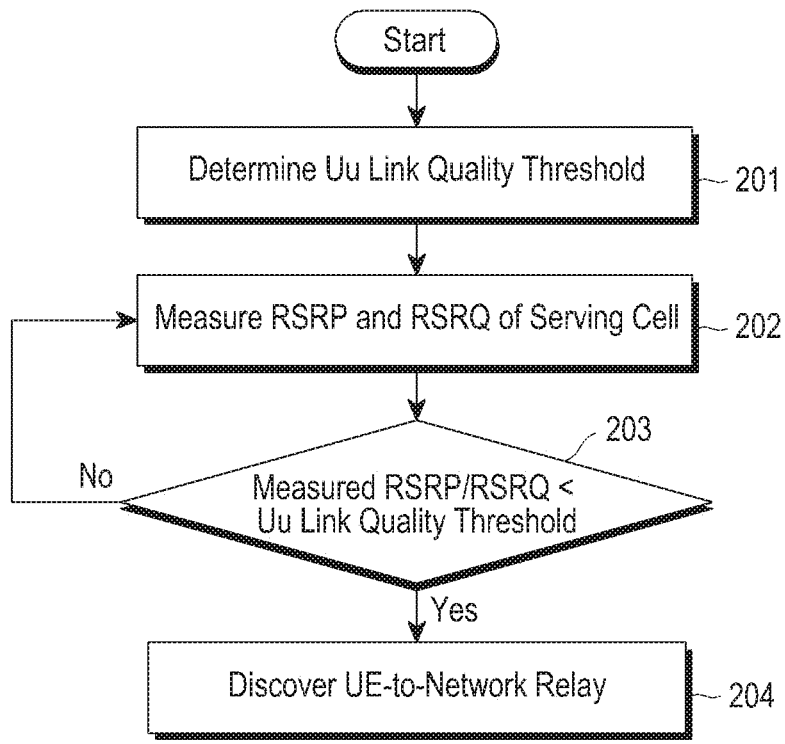
FIG. 2 shows a method for searching/discovering a UE-to-network relay, according to a first embodiment of the present disclosure.

FIG. 2 shows a method for searching/discovering a UE-to-network relay according to a first embodiment of the present disclosure.

Referring to FIG. 2, a remote UE capable of communicating with a network through a UE-to-network relay and within coverage of the network while trying to communicate with the network through the UE-to-network relay determines at least one Uu link quality threshold, in operation 201. Uu link refers to a radio link between UE and eNB.

Figure 3:
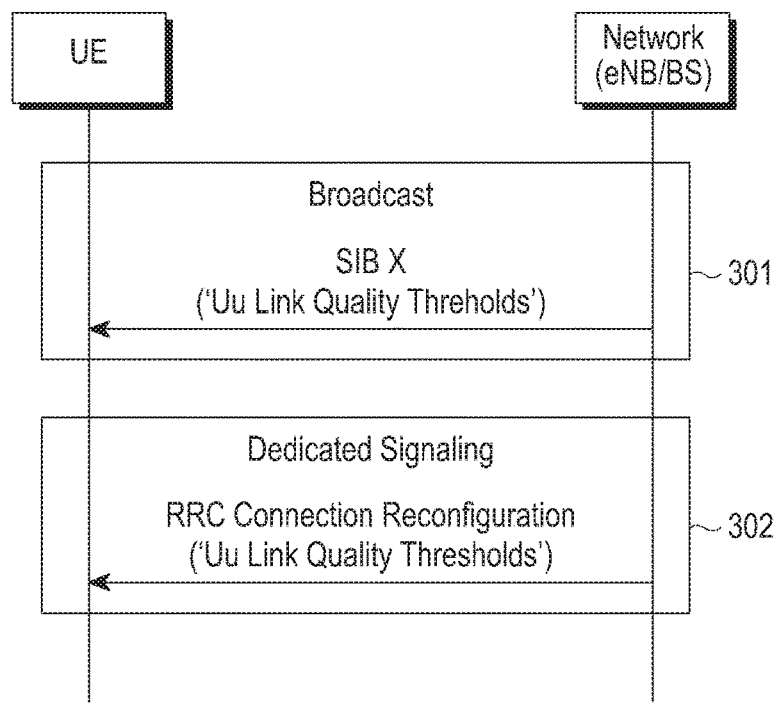
FIG. 3 shows a method for a remote UE to obtain a Uu link quality threshold according to an embodiment of the present disclosure.

FIG. 3 shows a method for a remote UE to obtain a Uu link quality threshold according to an embodiment of the present disclosure.

Referring to FIG. 3, a remote UE may obtain at least one Uu link quality threshold from system information broadcast by a serving cell in system information (e.g., system information block X), in operation 301. The serving cell may be a primary cell (PCell) or secondary cell (SCell) or a camped cell for the UE. Alternatively, the UE may obtain one or more Uu link quality thresholds from evolved terrestrial radio access network (EUTRAN) (i.e. eNB/BS) in dedicated signaling, in operation 302. Although not shown in FIG. 3, the UE may determine one or more Uu link quality thresholds on its own based on the UE configuration.

After determining the Uu link quality threshold this way, the remote UE measures a reference signal receive power (RSRP) or reference signal receive quality (RSRQ) of a communication link between the UE itself and the serving cell, in operation 202. The remote UE compares the Uu link quality threshold and the RSRP/RSRQ, in operation 203, and if the RSRP/RSRQ is less than the threshold, starts searching/discovering a UE-to-network relay, in operation 204. The remote UE may search/discover a UE-to-network relay by monitoring discovery resources or discovery physical channels for a relay discovery announcement message from a UE-to-network relay. Alternatively, the remote UE may search/discover a UE-to-network relay by sending a relay discovery solicitation message. In a case that the remote UE is in radio resource control (RRC) idle state, the remote UE may use broadcast discovery resources for transmitting the relay discovery solicitation message once the thresholds for participation in relay discovery are met. In a case that a remote UE is in RRC connected state, the remote UE may send a discovery resource request to an eNB for transmitting a relay discovery solicitation message once the thresholds for participation in relay discovery are met. If the measured RSRP/RSRQ of a communication link between the remote UE itself and the serving cell is less than the Uu link quality threshold for a certain period (set or configured by the eNB/BS), the remote UE may start to search/discover a UE-to-network Relay.

If the RSRP/RSRQ of the serving cell measured since the remote UE started searching/discovering a UE-to-network relay is higher than the Uu link quality threshold, the remote UE may stop searching/discovering a UE-to-network relay. Alternatively, if the measured RSRP/RSRQ of a communication link between the remote UE itself and the serving cell is higher than the Uu link quality threshold for a certain period (set or configured by the eNB/BS), the remote UE may stop searching/discovering a UE-to-network Relay. According to an embodiment of the present disclosure, the thresholds to trigger the start and stop searching/discovering a UE-to-Network Relay may be different from one another.

The eNB/BS may signal a hysteresis value along with the Uu link quality threshold. In this case, the remote UE may start searching/discovering a UE-to-Network Relay if the measured RSRP/RSRQ is below the Uu link quality threshold by the hysteresis value. The remote UE may stop searching/discovering a UE-to-Network Relay if the measured RSRP/RSRQ is above the Uu link quality threshold.

Several cases of signaling one or more thresholds for starting/stopping searching/discovering a UE-to-network relay will now be described.

The first case is a case that an eNB signals a maximum Uu link quality threshold without signaling the hysteresis value.

The remote UE measures the Uu link quality (RSRP/RSRQ) of a radio link between the remote UE itself and the serving cell, and if the measured RSRP/RSRQ of the serving cell is less than or equal to the maximum Uu link quality threshold signaled from the eNB, the remote UE starts searching/discovering a UE-to-network relay. If the remote UE is searching/discovering a UE-to-network relay and the measured RSRP/RSRQ of the serving cell is greater than or equal to the maximum Uu link quality threshold signaled from the eNB, the remote UE stops searching/discovering a UE-to-network relay.

The second case is a case that an eNB signals a maximum Uu link quality threshold and a start hysteresis.

The remote UE measures the Uu link quality (RSRP/RSRQ) of a radio link between the remote UE itself and the serving cell, and if the measured RSRP/RSRQ of the serving cell is below the maximum Uu link quality threshold signaled from the eNB by the start hysteresis, the remote UE starts searching/discovering a UE-to-network relay. If the remote UE is sending information indicating itself as a UE-to-network relay and the measured RSRP/RSRQ of the serving cell is above the maximum Uu link quality threshold signaled from the eNB, the remote UE stops searching/discovering a UE-to-network relay.

The third case is a case that an eNB signals a maximum Uu link quality threshold and a stop hysteresis.

The remote UE measures the Uu link quality (RSRP/RSRQ) of a radio link between the remote UE itself and the serving cell, and if the measured RSRP/RSRQ of the serving cell is below the maximum Uu link quality threshold signaled from the eNB, the remote UE starts searching/discovering a UE-to-network relay. If the remote UE is sending information indicating itself as a UE-to-network relay and the measured RSRP/RSRQ of the serving cell is above the Uu link quality threshold signaled from the eNB by a stop hysteresis value, the remote UE stops searching/discovering a UE-to-network relay.

The fourth case is a case that an eNB signals a minimum Uu link quality threshold without signaling the hysteresis value.

The remote UE measures the Uu link quality (RSRP/RSRQ) of a radio link between the remote UE itself and the serving cell, and if the measured RSRP/RSRQ of the camped/serving cell exceeds (or equal to or higher than) the minimum Uu link quality threshold signaled from the eNB, the remote UE starts searching/discovering a UE-to-network relay. If the remote UE is searching/discovering a UE-to-network relay and the measured RSRP/RSRQ of the camped/serving cell is equal to or lower than (or below) the minimum Uu link quality threshold signaled from the eNB, the remote UE stops searching/discovering a UE-to-network relay.

The fifth case is a case that an eNB signals a minimum Uu link quality threshold and a start hysteresis value.

The remote UE measures the Uu link quality (RSRP/RSRQ) of a radio link between the remote UE itself and the camped/serving cell, and if the measured RSRP/RSRQ of the serving cell is above the minimum Uu link quality threshold signaled from the eNB by the start hysteresis, the UE starts searching/discovering a UE-to-network relay. If the remote UE is searching/discovering a UE-to-network relay and the measured RSRP/RSRQ of the camped/serving cell is below the minimum Uu link quality threshold signaled from the eNB, the remote UE stops searching/discovering a UE-to-network relay.

The sixth case is a case that an eNB signals a minimum Uu link quality threshold and a stop hysteresis value.

The remote UE measures the Uu link quality (RSRP/RSRQ) of a radio link between the remote UE itself and the camped/serving cell, and if the measured RSRP/RSRQ of the serving cell is above the minimum Uu link quality threshold signaled from the eNB, the remote UE starts searching/discovering a UE-to-network relay. If the remote UE is searching/discovering a UE-to-network relay and the measured RSRP/RSRQ of the camped/serving cell is below the minimum Uu link quality threshold signaled from the eNB by a stop hysteresis value, the remote UE stops searching/discovering a UE-to-network relay.

The seventh case is a case that an eNB signals the maximum Uu link quality threshold, Threshold1, and the minimum Uu link quality threshold, Threshold 2 without signaling a hysteresis value.

A remote UE measures Uu link quality (RSRP/RSRQ) of a radio link between the remote UE itself and a serving cell, and if the measured RSRP/RSRQ of the caped/serving cell signaled from the eNB is between two thresholds (i.e., Threshold 2<measured RSRP/RSRQ<Threshold 1, or Threshold 2<=measured RSRP/RSRQ<=Threshold 1), the remote UE starts searching/discovering a UE-to-network relay. If the remote UE is searching/discovering a UE-to-network relay and the measured RSRP/RSRQ of the camped/serving cell does not meet the condition (Threshold 2<measured RSRP/RSRQ<Threshold 1, or Threshold 2<=measured RSRP/RSRQ<=Threshold 1), the remote UE stops searching/discovering a UE-to-network relay.

The eighth case is a case that an eNB signals the maximum Uu link quality threshold, Threshold1, the minimum Uu link quality threshold, Threshold 2, and start hysteresis values (maximum hysteresis value and minimum hysteresis value)

The remote UE measures the Uu link quality (RSRP/RSRQ) of a radio link between the remote UE itself and the camped/serving cell, and if the measured RSRP/RSRQ of the camped/serving cell is above Threshold 2 by the maximum hysteresis value but below Threshold 1 by the minimum hysteresis value, the remote UE starts searching/discovering a UE-to-network relay. If the remote UE is searching/discovering a UE-to-network relay and the measured RSRP/RSRQ of the camped/serving cell is not above Threshold 1 or below Threshold 2, the remote UE stops searching/discovering a UE-to-network relay.

The ninth case is a case that an eNB signals the maximum Uu link quality threshold, Threshold1, the minimum Uu link quality threshold, Threshold 2, and stop hysteresis values (maximum hysteresis value and minimum hysteresis value).

The remote UE measures the Uu link quality (RSRP/RSRQ) of a radio link between the remote UE itself and the camped/serving cell, and if the measured RSRP/RSRQ of the camped/serving cell is above Threshold 2 but below Threshold 1, the remote UE starts searching/discovering a UE-to-network relay. Furthermore, if the remote UE is searching/discovering a UE-to-network relay and the measured RSRP/RSRQ of the camped/serving cell is not above Threshold 1 by the maximum hysteresis value or below Threshold 2 by the minimum hysteresis value, the remote UE stops searching/discovering a UE-to-network relay.

In the aforementioned methods, Uu link quality thresholds are used for the remote UE to search/discover a UE-to-network relay. The Uu link quality thresholds may also be used for the remote UE to determine whether to communicate with or connect to the UE-to-network relay.

Figure 4:
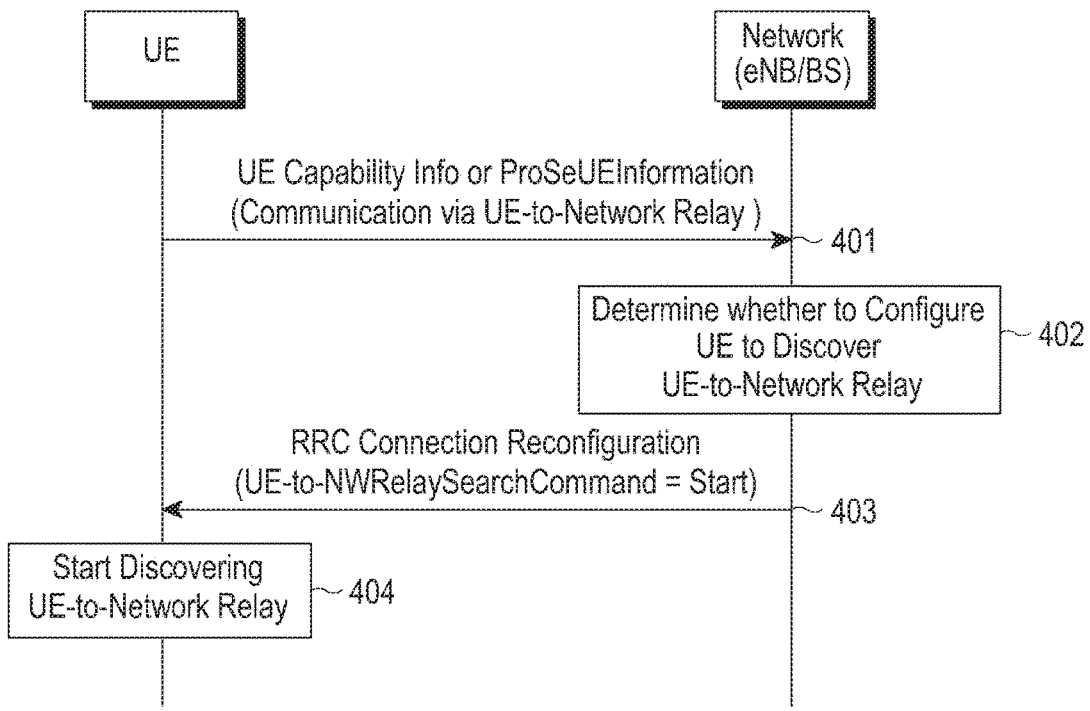
FIGS. 4 and 5 show methods for searching/discovering a UE-to-network relay according to a second embodiment of the present disclosure.
Figure 5:
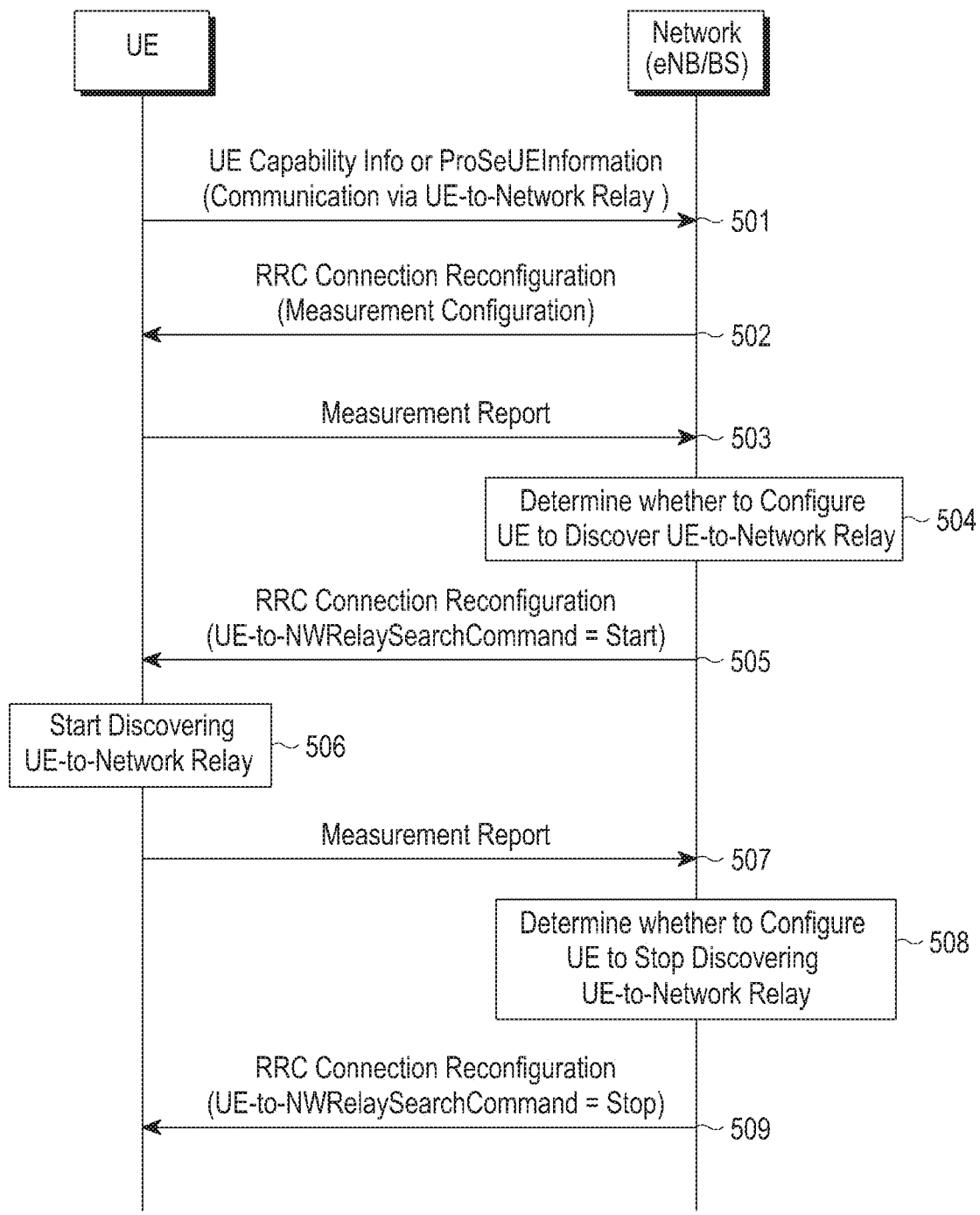

FIGS. 4 and 5 show methods for searching/discovering a UE-to-network relay according to a second embodiment of the present disclosure.

Referring to FIG. 4, an eNB instructs a UE capable of communicating with a network through a UE-to-network relay to start monitoring a device-to-device (D2D) communication link and search/discover the UE-to-network relay, in operation 403. The instruction may be sent only to UEs that have showed intentions in operation 401 to communicate with the network through a UE-to-network relay. The eNB may determine to send the instruction based on a load condition in the cell, in operation 402. Upon reception of the instruction from the eNB, the UE starts monitoring a D2D communication link to discover a UE-to-network relay, in operation 404.

An eNB may instruct a UE capable of communicating with a network through a UE-to-network relay to start monitoring a D2D communication link and search/discover the UE-to-network relay, based on a measurement report from the UE.

Referring to FIG. 5, a UE sends an intention to communicate with a network through a UE-to-network relay to an eNB, in operation 501, and the eNB sends an RRC connection reconfiguration message to the UE, in operation 502. The UE sends a measurement report to the eNB in operation 503, and the eNB determines whether to configure the UE to discover a UE-to-network relay based on the measurement report in operation 504. The eNB determines to configure the UE to discover a UE-to-network relay if RSRP reported in the measurement report is less than a predetermined UE-to-network relay search/discovery triggering threshold (UE-to-NWrelaysearchtriggerthresh). The eNB then instructs the UE to start monitoring a D2D communication link and to search/discover a UE-to-network relay, in operation 505. The instruction may be sent only to UEs that have showed intentions to communicate with the network through a UE-to-network relay. Upon reception of the instruction from the eNB, the UE starts monitoring a D2D communication link to discover a UE-to-network relay, in operation 506.

The eNB may communicate with a network through a UE-to-network relay, and even send an instruction to stop searching/discovering a UE-to-network relay to the UE. For this, the eNB receives a measurement report from the UE, which is searching/discovering a UE-to-network relay, in operation 507. If RSRP reported in the measurement report is higher than the UE-to-network relay search/discover triggering threshold (UE-to-NWrelaysearchtriggerthresh), the eNB determines to stop searching/discovering a UE-to-network relay, in operation 508. The eNB then instructs the UE to stop searching/discovering a UE-to-network relay, in 509.

In a case where UE-to-NWrelaysearchtriggerthresh is broadcast in system information and the UE is in the RRC connection state, the UE may start/stop searching/discovering a UE-to-network relay by UE-to-UE-to-NWrelaysearchtriggerthresh based triggering if no instruction to start/stop searching/discovering a UE-to-network relay is received from the network.

FIGS. 6, 7, 8, 9, 10, 11, and 12 show methods for searching/discovering a UE-to-network relay according to a third embodiment of the present disclosure. In the third embodiment of the present disclosure, it is assumed that a remote UE has already been in communication with a network through a UE-to-network relay.

Figure 6:
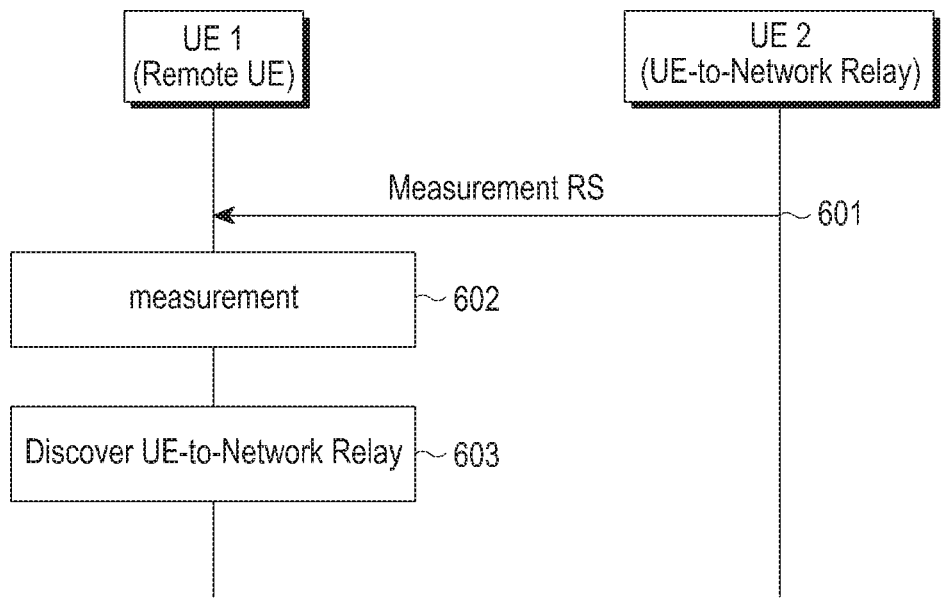
FIGS. 6, 7, 8, 9, 10, 11, and 12 show methods for searching/discovering a UE-to-network relay according to a third embodiment of the present disclosure.

Referring to FIG. 6, the remote UE UE1 measures RSRP/RSRQ of a link with a UE-to-network relay UE2, in operation 602. The RSRP/RSRQ is measured using a sidelink synchronization signal (SLSS), a demodulation reference signal (DMRS), a new reference signal (RS), or a discovery message sent by the UE-to-Network relay, in operation 601. If the measured RSRP/RSRQ is less than a predetermined threshold, the remote UE starts searching/discovering another UE-to-Network relay, in operation 603. Alternatively, the remote UE may start searching/discovering another UE-to-network relay only if the measured RSRP/RSRQ is less than the predetermined threshold for a certain time.

Figure 7:
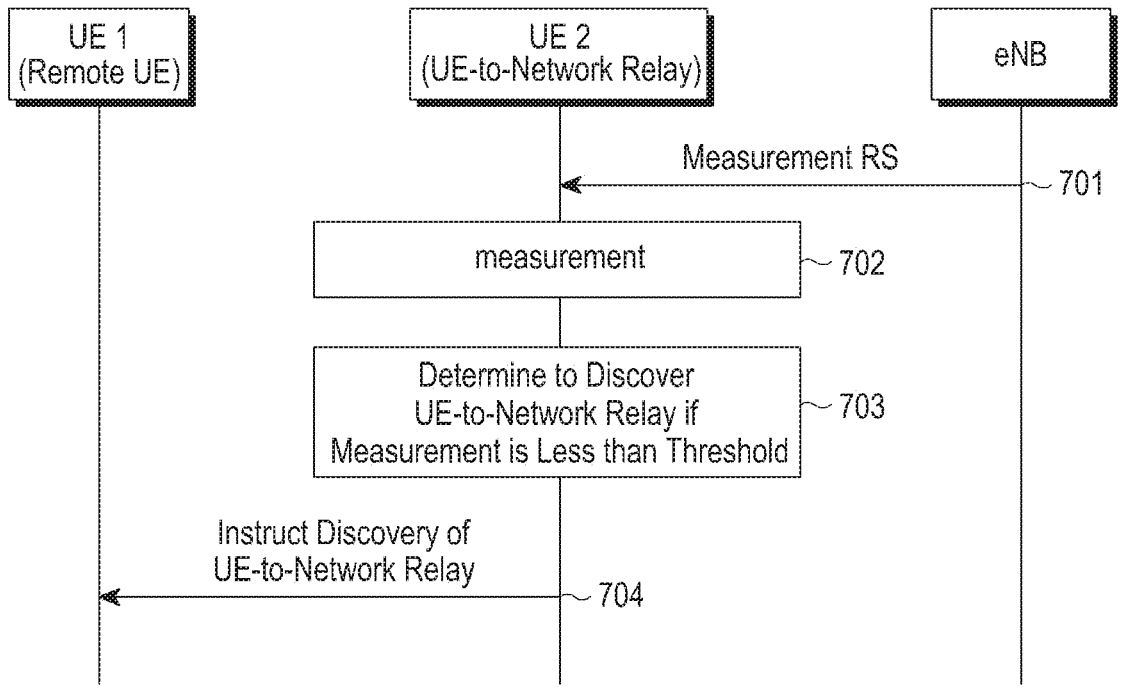

Referring to FIG. 7, the UE-to-network relay UE2 receives an SLSS, DMRS, or new RS from a network (eNB) in operation 701, and measures RSRP/RSRQ of a link between the UE-to-network relay UE2 and the network based on the received signal, in operation 702. The UE-to-network relay UE2 compares the measured RSRP/RSRQ with a predetermined threshold, in operation 703. If the measured RSRQ/RSRQ is less than the predetermined threshold, the UE-to-network relay UE2 instructs the remote UE UE1 to search/discover another UE-to-network relay, in operation 704. Alternatively, the UE-to-network relay UE2 may instruct the remote UE to search/discover another UE-to-network relay only if the measured RSRP/RSRQ is less than the predetermined threshold for a certain time. The instruction may be sent as a media access control (MAC) control element (CE) in a MAC protocol data unit (PDU) or in a discovery message or a new message.

Figure 8:
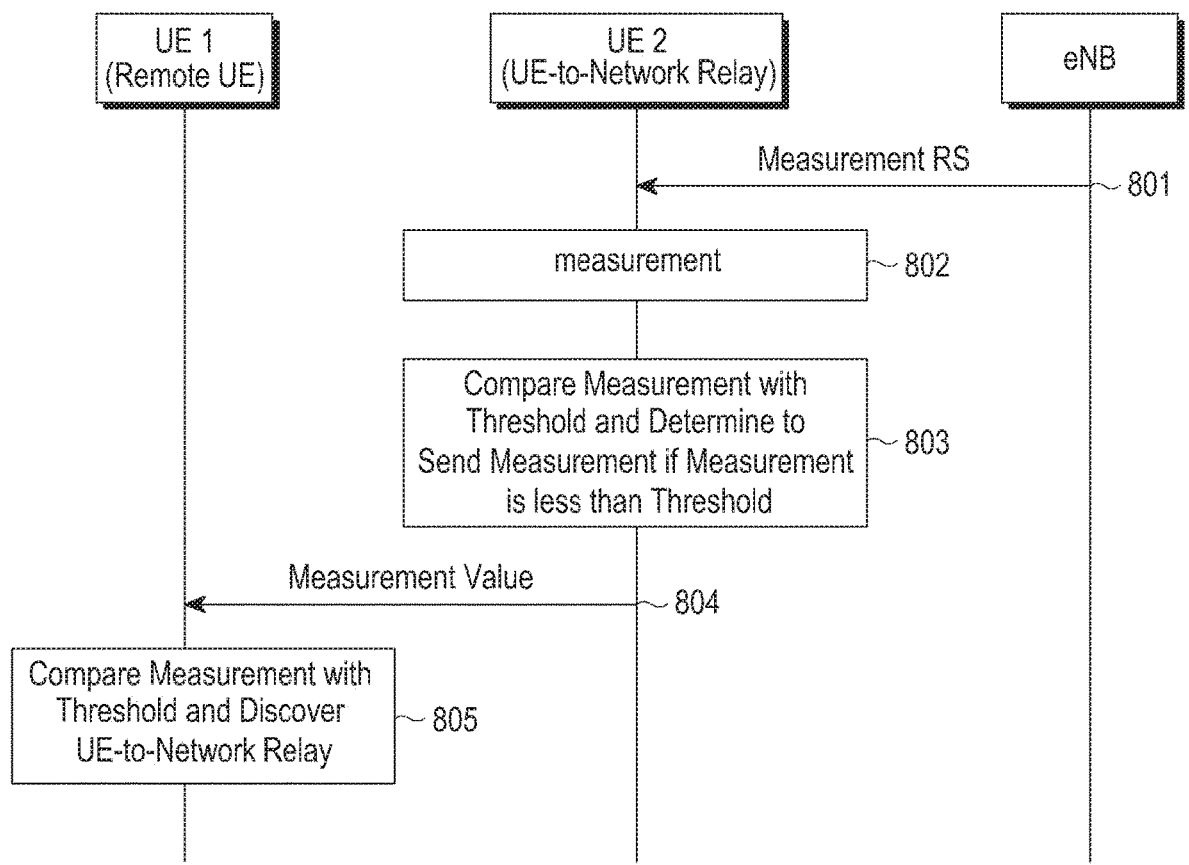

Referring to FIG. 8, the UE-to-network relay UE2 receives an SLSS, DMRS, or new RS from a network (eNB) in operation 801, and measures RSRP/RSRQ of a link between the UE-to-network relay UE2 and the network based on the received signal, in operation 802. The UE-to-network relay UE2 compares the measured RSRP/RSRQ with a predetermined threshold, in operation 803. If the measured RSRQ/RSRQ is less than the predetermined threshold, the UE-to-network relay UE2 sends the measured RSRP/RSRQ to the remote UE UE1, in operation 804. Alternatively, the UE-to-network relay UE2 may send the measured RSRP/RSRQ to the remote UE only if the measured RSRP/RSRQ is less than the predetermined threshold for a certain time. The measured RSRP/RSRQ may be sent as a MAC CE in a MAC PDU or a discovery message or a new message. Upon reception of the RSRQ/RSRQ from the UE-to-network relay UE2, the remote UE determines that the received RSRQ/RSRQ is less than the predetermined threshold and starts searching/discovering another UE-to-network relay, in operation 805.

Figure 9:
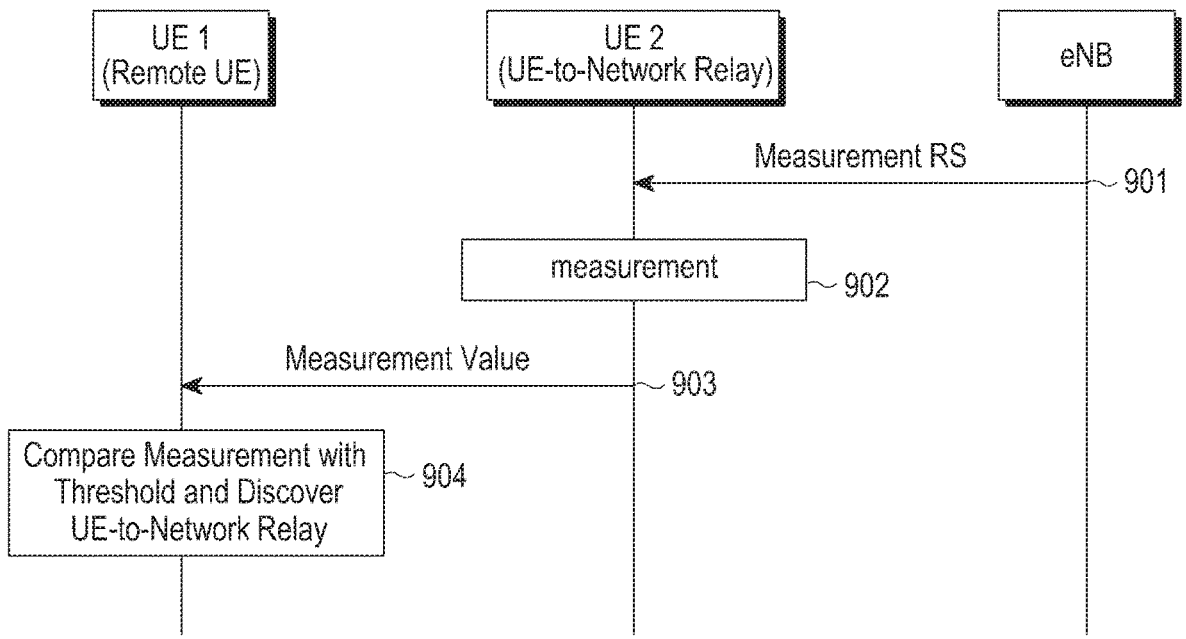

Referring to FIG. 9, the UE-to-network relay UE2 receives an SLSS, DMRS, or new RS from a network (eNB) in operation 901, measures RSRP/RSRQ of a link between the UE-to-network relay UE2 and the network based on the received signal in operation 902, and forwards the measured RSRP/RSRQ to the remote UE UE1, in operation 903. Upon reception of the RSRQ/RSRQ from the UE-to-network relay UE2, the remote UE compares the received RSRQ/RSRQ with a predetermined threshold, and if the received RSRQ/RSRQ is less than the predetermined threshold, the remote starts searching/discovering another UE-to-network relay, in operation 904. Alternatively, the remote UE may start searching/discovering another UE-to-network relay only if the received RSRP/RSRQ is less than the predetermined threshold for a certain time.

Figure 10:
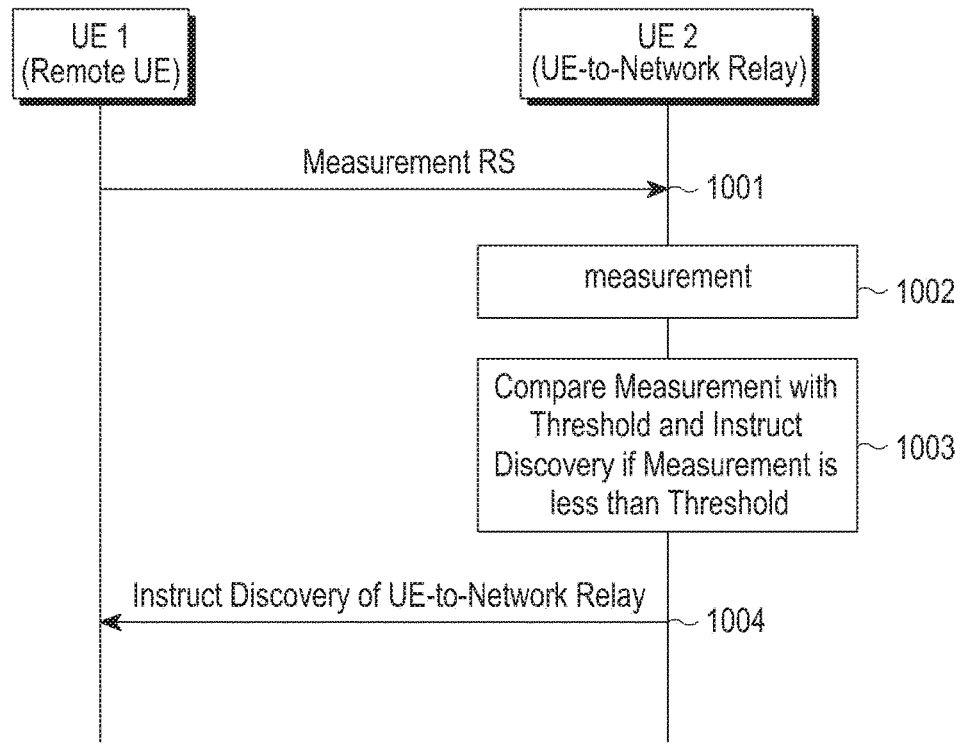

Referring to FIG. 10, the UE-to-network relay UE2 receives an SLSS, DMRS, or new RS from a remote UE (UE1) in operation 1001, and measures RSRP/RSRQ of a link between the UE-to-network relay UE2 and the remote UE based on the received signal, in operation 1002. The UE-to-network relay compares the measured RSRP/RSRQ with a predetermined threshold, in operation 1003. If the measured RSRQ/RSRQ is less than the predetermined threshold, the UE-to-network relay UE2 instructs the remote UE to search/discover another UE-to-network relay, in operation 1004. Alternatively, the UE-to-network relay may instruct the remote UE to search/discover another UE-to-network relay only if the measured RSRP/RSRQ is less than the predetermined threshold for a certain time. The instruction may be sent as a MAC CE in a MAC PDU, or in a discovery message or new message.

Figure 11:
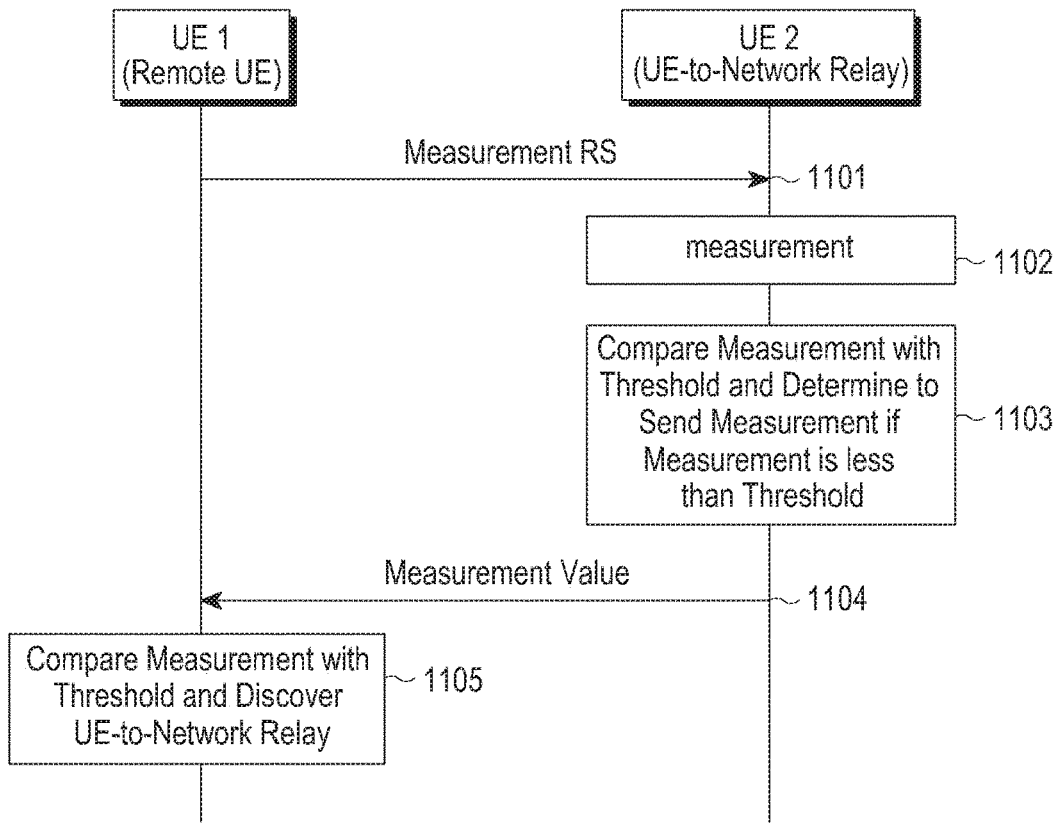

Referring to FIG. 11, the UE-to-network relay UE2 receives an SLSS, DMRS, or new RS from a remote UE (UE1) in operation 1101, and measures RSRP/RSRQ of a link between the UE-to-network relay UE2 and the remote UE based on the received signal, in operation 1102. The UE-to-network relay compares the measured RSRP/RSRQ with a predetermined threshold, in operation 1103. If the measured RSRQ/RSRQ is less than the predetermined threshold, the UE-to-network relay UE2 forwards the measured RSRP/RSRQ to the remote UE, in operation 1104. Alternatively, the UE-to-network relay UE2 may send the measured RSRP/RSRQ to the remote UE only if the measured RSRP/RSRQ is less than the predetermined threshold for a certain time. The measured RSRP/RSRQ may be sent as a MAC CE in a MAC PDU, or in a discovery message or new message. Upon reception of the measured RSRQ/RSRQ, the remote UE determines that the measured RSRQ/RSRQ is less than the predetermined threshold and starts searching/discovering another UE-to-network relay, in operation 1105.

Figure 12:
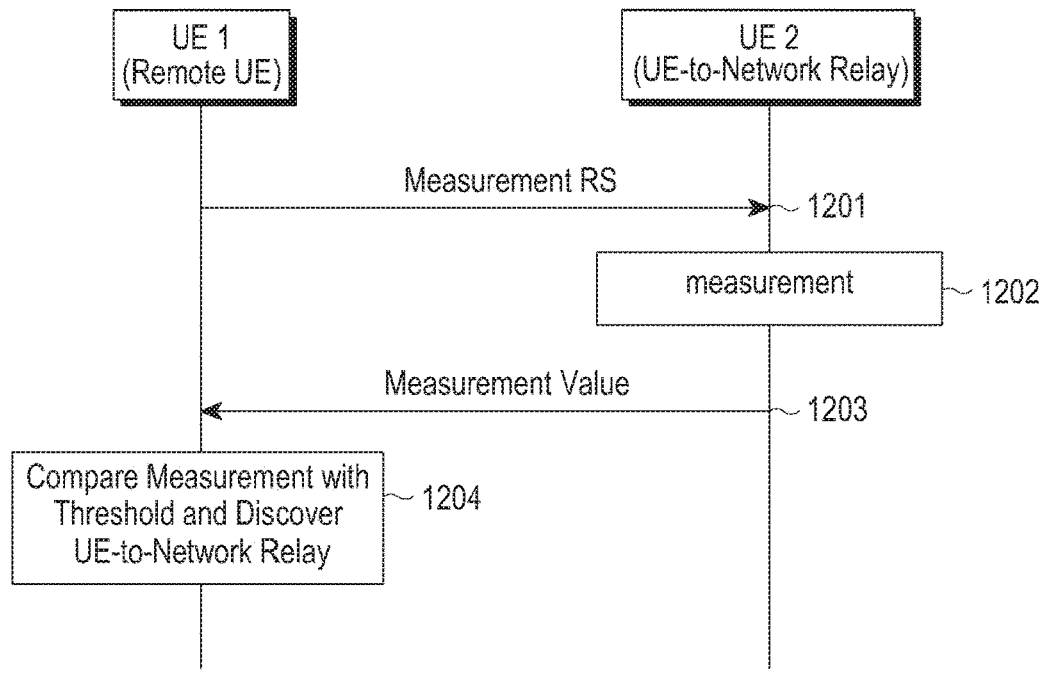

Referring to FIG. 12, the UE-to-network relay UE2 receives an SLSS, DMRS, or new RS from a remote UE (UE1) in operation 1201, and measures RSRP/RSRQ of a link between the UE-to-network relay UE2 and the remote UE based on the received signal, in operation 1202. The UE-to-network relay UE2 then forwards the measured RSRP/RSRQ to the remote UE, in operation 1203. The remote UE compares the received RSRQ/RSRQ with a predetermined threshold, and if the received RSRQ/RSRQ is less than the predetermined threshold, the remote UE starts searching/discovering another UE-to-network relay, in operation 1204. Alternatively, the remote UE may start searching/discovering another UE-to-network relay only if the received RSRP/RSRQ is less than the predetermined threshold for a certain time.

According to the aforementioned methods for searching/discovering a UE-to-network relay of FIGS. 6, 7, 8, 9, 10, 11, and 12, a main entity for determining whether to perform search/discovery may be the remote UE or the UE-to-network relay, and the RSRP/RSRQ to be used in determining whether to perform search/discovery may be about a link between the remote UE and the UE-to-network relay or a link between the UE-to-network relay and the network.

Furthermore, the aforementioned drawings and various embodiments may be used individually or in a combination of two or more embodiments.

Figure 13:
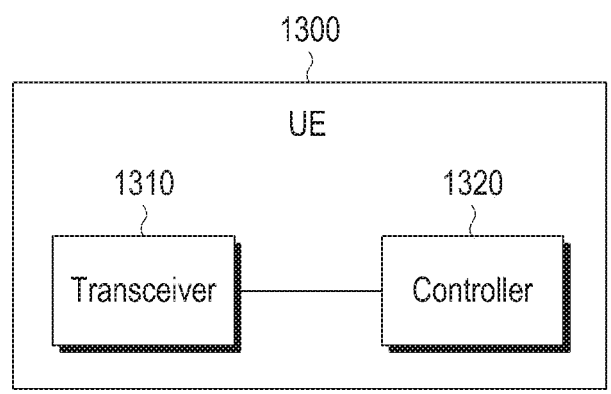
FIG. 13 is a block diagram of a UE according to an embodiment of the present disclosure.

FIG. 13 is a block diagram of a UE according to an embodiment of the present disclosure. A UE of FIG. 13 may be a remote UE or a UE-to-network relay.

Referring to FIG. 13, the UE 1300 may include a transceiver 1310 for performing data communication with various network nodes and eNB, and a controller (e.g. processor) 1320 for controlling the transceiver 1310. All the functions of the remote UE or UE-to-network relay as described above in the specification may be interpreted as being performed under the control of the controller 1320.

Although FIG. 13 shows the transceiver 1320 and the controller 1320 separately, the transceiver 1310 and the controller 1320 may be an integrated component.

Figure 14:
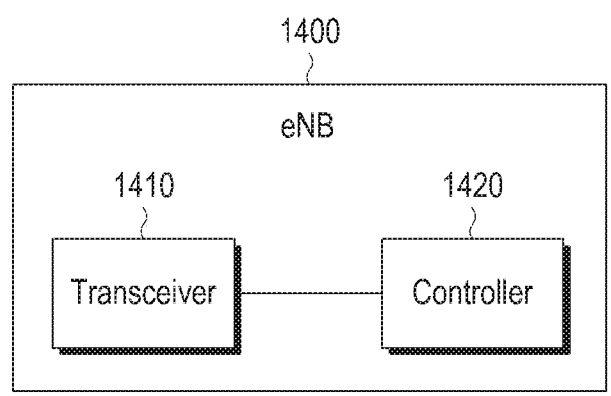
FIG. 14 is a block diagram of an evolved node B (eNB) according to an embodiment of the present disclosure.

FIG. 14 is a block diagram of a network (eNB) according to an embodiment of the present disclosure.

Referring to FIG. 14, eNB 1400 may include a transceiver 1410 for performing data communication with various network nodes and UE-to-network relays, and a controller (e.g. processor) 1420 for controlling the transceiver 1410. All the functions of the eNB as described above in the specification may be interpreted as being performed under the control of the controller 1420.

Although FIG. 14 shows the transceiver 1420 and the controller 1420 separately, the transceiver 1410 and the controller 1320 may be an integrated component.

The foregoing functions may be implemented by corresponding program codes stored in a memory device equipped in an entity, function, eNB, packet data network (PDN) gateway (P-GW) or UE in a communication system. The controller of the entity, function, eNB, P-GW or UE may perform the foregoing operations by reading out and executing the program codes stored in the memory device with a processor or the central processing unit (CPU).

Various components and modules of the entity, function, eNB, P-GW, or UE as described in the present disclosure may be implemented in hardware, such as complementary metal oxide semiconductor (CMOS)-based logic circuits, firmware, software, or a combination thereof. For example, various electronic structures and methods may be practiced using electrical circuits, such as transistors, logic gates, and application specific integrated circuits (ASICs).

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for device-to-device (D2D) communication, by a remote user equipment (UE), the method comprising:
receiving, from a base station, system information including a threshold of reference signal received power (RSRP) and a hysteresis value;
measuring RSRP between the base station and the remote UE;
identifying whether to transmit a discovery solicitation message based on a condition for communicating with a relay UE that serves as a relay between the remote UE and a network; and
transmitting the discovery solicitation message according that the condition is met,
wherein the condition is met in a case that the RSRP is below the threshold of RSRP by the hysteresis value, and
wherein the remote UE is in a radio resource control (RRC) idle state or an RRC connected state.

2. The method of claim 1, wherein the identifying of whether to transmit the discovery solicitation message comprises:
identifying that the discovery solicitation message is not to be transmitted according that the condition is not met,
wherein the condition is not met in a case that the RSRP is above the threshold of RSRP.

3. The method of claim 1, wherein the base station is associated with a primary cell (PCell) or a camped cell where the remote UE is camping.

4. The method of claim 1, further comprising:
measuring RSRP between the remote UE and the relay UE; and
transmitting a discovery solicitation message for discovering another relay UE that serves as a relay between the remote UE and the network in a case that the RSRP between the remote UE and the relay UE is below the threshold of RSRP.

5. A remote user equipment (UE) for device-to-device (D2D) communication, the remote UE comprising:
a transceiver; and
at least one processor configured to:
control the transceiver to receive, from a base station, system information including a threshold of reference signal received power (RSRP) and a hysteresis value,
measure RSRP between the base station and the remote UE,
identify whether to transmit a discovery solicitation message based on a condition for communicating with a relay UE that serves as a relay between the remote UE and a network, and
control the transceiver to transmit the discovery solicitation message according that the condition is met,
wherein the condition is met in a case that the RSRP is below the threshold of RSRP by the hysteresis value, and
wherein the remote UE is in a radio resource control (RRC) idle state or an RRC connected state.

6. The remote UE of claim 5,
wherein the at least one processor is configured to identify that the discovery solicitation message is not to be transmitted according that the condition is not met, and
wherein the condition is not met in a case that the RSRP is above the threshold of RSRP.

7. The remote UE of claim 5, wherein the base station is associated with a primary cell (PCell) or a camped cell where the remote UE is camping.

8. The remote UE of claim 5, wherein the at least one processor is further configured to:
measure RSRP between the remote UE and the relay UE, and
control the transceiver to transmit a discovery solicitation message for discovering another relay UE that serves as a relay between the remote UE and the network in a case that the RSRP between the remote UE and the relay UE is below the threshold of RSRP.

9. The remote UE of claim 5,
wherein the transceiver is further configured to receive measurement information from the relay UE, and
wherein the at least one processor is further configured to:
compare the received measurement information with the threshold of RSRP, and
control the transceiver to transmit a discovery solicitation message for discovering another relay UE that serves as a relay between the remote UE and the network based on a result of the comparison.

10. The method of claim 1, further comprising:
receiving measurement information from the relay UE;
comparing the received measurement information with the threshold of RSRP; and
transmitting a discovery solicitation message for discovering another relay UE that serves as a relay between the remote UE and the network based on a result of the comparison.

11. The method of claim 1, wherein the discovery solicitation message is transmitted for connecting or communicating with the relay.

12. The method of claim 1, wherein the transmitting of the discovery solicitation message comprises transmitting the discovery solicitation message using resources which are provided by the base station using broadcast signaling or dedicated signaling.

13. The method of claim 12, further comprising:
stop using the resources according that the RSRP is above the threshold of RSRP.

14. The remote UE of claim 5, wherein the discovery solicitation message is transmitted for connecting or communicating with the relay.

15. The remote UE of claim 5, wherein the transceiver is configured to transmit the discovery solicitation message using resources which are provided by the base station using broadcast signaling or dedicated signaling.

16. The remote UE of claim 15, wherein the at least one processor is further configured to control the transceiver to stop using the resources according that the RSRP is above the threshold of RSRP.

* * * * *